United States Patent [19]

Aoki

[11] Patent Number: 5,378,141
[45] Date of Patent: Jan. 3, 1995

[54] MOTOR DRIVEN TYPE DIE TIGHTENING APPARATUS FOR AN INJECTION MOLDING MACHINE

[75] Inventor: Hidemi Aoki, Sakakimachi, Japan

[73] Assignee: Nissei Plastic Industrial Co., Ltd., Nagano, Japan

[21] Appl. No.: 114,658

[22] Filed: Aug. 31, 1993

[30] Foreign Application Priority Data

Aug. 31, 1992 [JP] Japan ................. 4-255651

[51] Int. Cl.$^6$ ............................................. B29C 45/66
[52] U.S. Cl. .................. 425/589; 425/450.1; 425/595
[58] Field of Search ............ 425/589, 590, 595, 450.1, 425/451.2, 451.9, DIG. 223

[56] References Cited

U.S. PATENT DOCUMENTS

| | | | |
|---|---|---|---|
| 2,484,344 | 10/1949 | Hiller et al. | 425/589 |
| 3,104,433 | 9/1963 | Hoern | 425/590 |
| 4,315,728 | 2/1982 | Hehl | 425/450.1 |
| 4,540,359 | 9/1985 | Yamazaki | 425/589 |
| 4,797,086 | 1/1989 | Adachi | 425/590 |

FOREIGN PATENT DOCUMENTS 61-193821 8/1986 Japan .
1-36587 11/1989 Japan .
1-36588 11/1989 Japan .

*Primary Examiner*—James P. Mackey
*Attorney, Agent, or Firm*—Ostrolenk, Faber, Gerb & Soffen

[57] ABSTRACT

A motor driven type die tightening apparatus for an injection molding machine includes a plurality of tie bars horizontally bridged between a pair of stationary die boards mounted on a platform of the injection molding machine, and a movable die board is displaceably arranged between the stationary die boards with the tie bars inserted therethrough. A part of each of the tie bars inserted through the movable die board is designed in the form of a ball screw shaft adapted to be threadably engaged with a ball nut member. As an electric motor installed on one of the stationary die boards is rotationally driven to rotate the ball nut members, the movable die board is slidably displaced toward or away from one of the stationary die boards. A rotary sleeve having a number of balls arranged on the inner peripheral surface thereof is received in a stationary case firmly fitted into the movable die board, and a rotational shaft designed in the form of a ball spline shaft is inserted through the movable die board so as to enable the movable die board to be displaced in the axial direction by engagement of the balls with a plurality of splines formed along the spline shaft. The ball nut members, the rotary sleeve, the rotational shaft and the electric motor are operatively connected to each other via rotational power transmission members each extending around these components. The rotational power transmitting member is usually designed in the form of a geared endless belt.

8 Claims, 2 Drawing Sheets

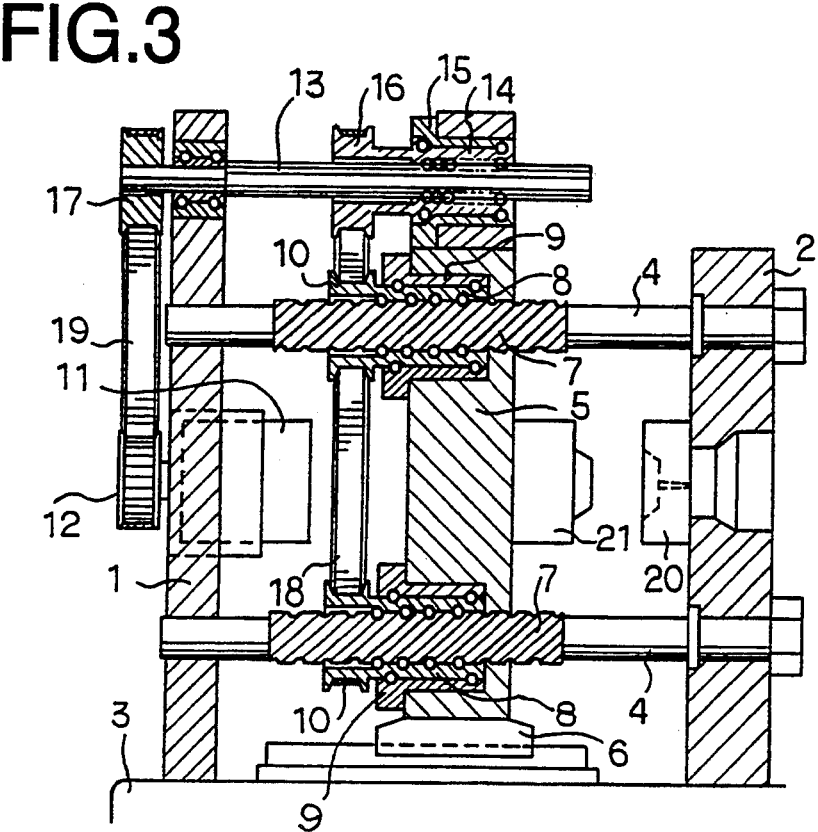
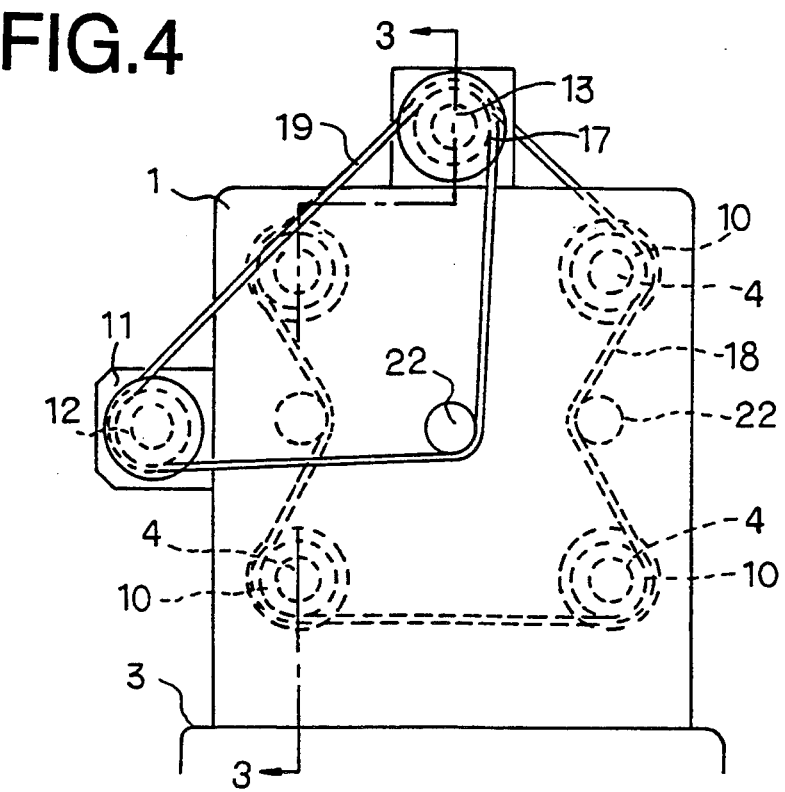

MOTOR DRIVEN TYPE DIE TIGHTENING APPARATUS FOR AN INJECTION MOLDING MACHINE

BACKGROUND OF THE INVENTION

1. Field of the Invention

The present invention relates generally to a motor driven type die tightening apparatus for an injection molding machine for injection-molding various kinds of articles of a synthetic resin wherein the apparatus is driven with the aid of an electric motor such as a servomotor or the like as a power source. More particularly, the present invention relates to improvement of a motor driven type die tightening apparatus of the foregoing type which assures that die opening, die closing and die tightening can be achieved at a high speed with a reduced quantity of electricity consumption.

2. Background Art

Various kinds of die tightening apparatus each operable with an electric motor as a power source for injection-molding various kinds of articles using a synthetic resin are already known in the art. Among them, three typical conventional die tightening apparatuses of the foregoing type are disclosed in official gazettes of Japanese Utility Model Publication Nos. 1-36587, 1-36588 and Japanese Patent Laid-Open Publication 61-193821.

According to one of the prior inventions, i.e., Japanese Utility Model Publication NO. 1-36587, a die tightening apparatus includes a vertically extending end housing, located opposite to a stationary die board having a stationary die half mounted thereon, to serve as a movable die board having a movable die half mounted thereon, and a plurality of die bars are horizontally bridged between the stationary die board and the end housing, i.e., the movable die board. One end part of the respective tie bars is fixedly secured to the stationary die board, while the other end part of the respective tie bars is inserted through the movable die board and designed in the form of a screw shaft adapted to be threadably engaged with nut members arranged in the movable die board. With this construction, rotation of the tie bars is transformed into linear movement of the movable die board via the threadable engagement of the screw shafts of the tie bars with the nut members of the movable die board. Thus, as an electric motor installed on the movable die board is rotationally driven, the tie bars are rotated by the electric motor via a rotational power transmitting mechanism, whereby die closing or die opening is achieved by the linear movement of the movable die board toward or away from the stationary die board. Incidentally, each die closing is effected by tightening a movable die half mounted on the movable die board against a stationary die half mounted on the stationary die board.

According to another one of the prior inventions, i.e., Japanese Utility Model Publication No. 1-36588, a plurality of tie bars each designed in the form of a screw shaft and horizontally bridged between a stationary die board and a movable die board are kept immovable, and an electric motor and a rotational power transmitting mechanism are arranged on the movable die board side. With this construction, as an electric motor is rotationally driven, the movable tie board is linearly displaced along the die bars via threadable engagement of the screw shafts of the tie bars with nut members arranged in the movable die board.

In addition, according to another one of the prior inventions, i.e., Japanese Patent Laid-Open Publication No. 1-193821, an electric motor and a rotational power transmitting mechanism are installed on a movable die board or a stationary die board.

With the conventional motor driven type die tightening apparatus of the type constructed such that the movable die board is displaced by rotating the respective tie bars, since it is necessary that one end of the long tie bars be rotated by the rotational power transmitting mechanism, a larger magnitude of torque, much more than if the other end of the tie bars on the nut member side is rotated by the foregoing mechanism, is required for displacing the movable die board. A problem of the conventional apparatus to be solved is that a high level of technique is required for the purpose of supporting the opposite ends of each long tie bar without any particular error.

In addition, with the conventional motor driven type die tightening apparatus of the type constructed such that the nut members are rotated for displacing the movable die board, since the electric motor, the nut members, the rotational power transmitting mechanism and associated components are arranged on the movable die board, the weight of the movable die board is unavoidably increased, resulting in a rotational load to be borne by the electric motor being increased correspondingly. Thus, a large-sized electric motor capable of outputting a large magnitude of torque is required. Additionally, since a large part of the weight of the movable board is borne by the screw shaft portions of the tie bars, the latter are liable to be readily deflected compared with ordinary tie bars. Thus, another problem of the conventional apparatus to be solved is that it is difficult to maintain a high accuracy of the parallel extension of the movable die board relative to the stationary die board.

SUMMARY OF THE INVENTION

The present invention has been made in consideration of the aforementioned background.

An object of the present invention is to provide a motor driven type die tightening apparatus for an injection molding machine which assures that a movable die board can be displaced on a platform of the injection molding machine with an electric motor installed on the movable die board as a supply source via threadable engagement of ball nut members arranged in the movable die board with ball screw shafts of tie bars horizontally bridged between a pair of stationary die board without any necessity for rotating the tie bars while a high accuracy is maintained in respect of parallel extension of the movable die board relative to the stationary die boards.

Another object of the present invention is to provide a motor driven type die tightening apparatus for an injection molding machine which assures that die opening, die closing and die tightening can be achieved using a small-sized electric motor capable of outputting a small magnitude of torque at a high speed with a reduced quantity of electricity consumption while each of the die opening, the die closing and the die tightening is properly controlled.

The present invention provides a motor driven type die tightening apparatus for an injection molding machine including a plurality of tie bars horizontally bridged between a pair of stationary die boards mounted on a platform of the injection molding machine, a movable die board displaceably arranged between the stationary die boards with the tie bar inserted therethrough, a ball screw shaft formed across a part of each of the tie bars inserted through the movable die board, and a ball nut member threadably engaged with the ball screw shaft and having a geared pulley integrated therewith so that as an electric motor is rotationally driven, the movable die board is slidably displaced toward or away from one of the stationary die boards, wherein the electric motor is installed on one of the stationary die boards; a rotary sleeve having a number of balls arranged on the inner peripheral surface thereof is received in a stationary case firmly fitted into the movable die board, and a ball spline shaft is inserted through the rotary sleeve so as to enable the movable die board to be displaced in the axial direction by engagement of the balls with a plurality of splines formed along the spline shaft; the ball nut member, the rotary sleeves, the rotational shafts and the electric motor are operatively connected to each other via rotational power transmitting members; and as the electric motor is rotationally driven to rotate the ball nut member, the movable die board is slidably displaced toward or away from one of the stationary die boards.

The movable die board is mounted on two guide members laid on a platform of the injection molding machine so that the weight of the movable die board is borne by the platform of the injection molding machine via the guide members. The tie bars are arranged in the diagonal positional relationship relative to the movable die board and the stationary die boards while extending in parallel with each other. In addition, the tie bars are arranged at four corners of the movable die board and the stationary die boards while extending in parallel with each other, and moreover, they are secured to the stationary die boards without any occurrence of rotation thereof.

The rotational shaft designed in the form of a ball spline shaft is rotatably bridged between both the stationary die boards while extending through the movable die board. Alternatively, the rotational shaft may be arranged at the upper parts of the movable shaft and one of the stationary shafts.

With the motor driven type die tightening apparatus constructed in the above-described manner, the rotational power generated by the electric motor is transmitted to the rotational shaft, and subsequently, it is transmitted to the ball nut members via the rotary sleeves, causing the ball nut members to be rotated, whereby the movable die board is displaced along the ball screw shafts in the axial direction. The rotational shaft designed in the form of a ball spline shaft allows the movable die board to be displaced together with the rotary sleeve in the axial direction. As a result, the displacement of the movable die board is properly guided by the tie bars and the rotational shaft. The direction of displacement of the movable die board can be changed depending on the direction of rotation of the electric motor. Thus, as the electric motor is rotationally driven to displace the movable die board toward or away from one of the stationary die boards, die opening, die closing and die tightening can be achieved with the motor driven type die tightening apparatus.

According to the present invention, since the rotational shaft designed in the form of a spline shaft is bridged between the opposite stationary die boards or between the movable die board and one of the stationary die board, and moreover, the ball nut members each threadably engaged with the ball screw shaft via engagement of a number of balls therewith, the rotary members ratably received in the movable die board, the rotational shaft and the electric motor are operatively connected to each other via geared endless belts extending around these components, the rotational power generated by the electric motor can reliably be transmitted to the ball nut members in the movable die board so as to allow the latter to be displaced toward or away from one of the stationary die boards. With this construction, the weight of the movable die board can be reduced, and an excellent accuracy in respect of parallel extension of the movable die board relative to the stationary die board can be maintained.

Since the ball nut members in the movable die board are rotated but the tie bars are not rotated, a load to be borne by the electric motor can be reduced compared with the case that the tie bars are rotated, causing the movable die board to be smoothly displaced. This leads to the result that a small-sized electric motor adapted to output a small magnitude of torque can be employed for the motor driven type die tightening apparatus with a reduced quantity of electricity consumption, and moreover, die opening, die closing and die tightening can be achieved at a high speed while each of the die opening, the die closing and the die tightening is properly controlled.

Other object, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 3 is a sectional view of a motor driven type die tightening apparatus for an injection molding machine constructed according to another embodiment of the present invention, particularly showing the structure of the apparatus taken along line B—B in FIG. 4; and FIG. 4 is a front view of the apparatus shown in FIG. 3, particularly showing the structure of the apparatus as seen from the stationary die board side.

DETAILED DESCRIPTION OF THE PREFERRED EMBODIMENTS

The present invention will now be described in detail hereinafter with reference to the accompanying drawings which illustrate a few preferred embodiments thereof.

Figure 1:
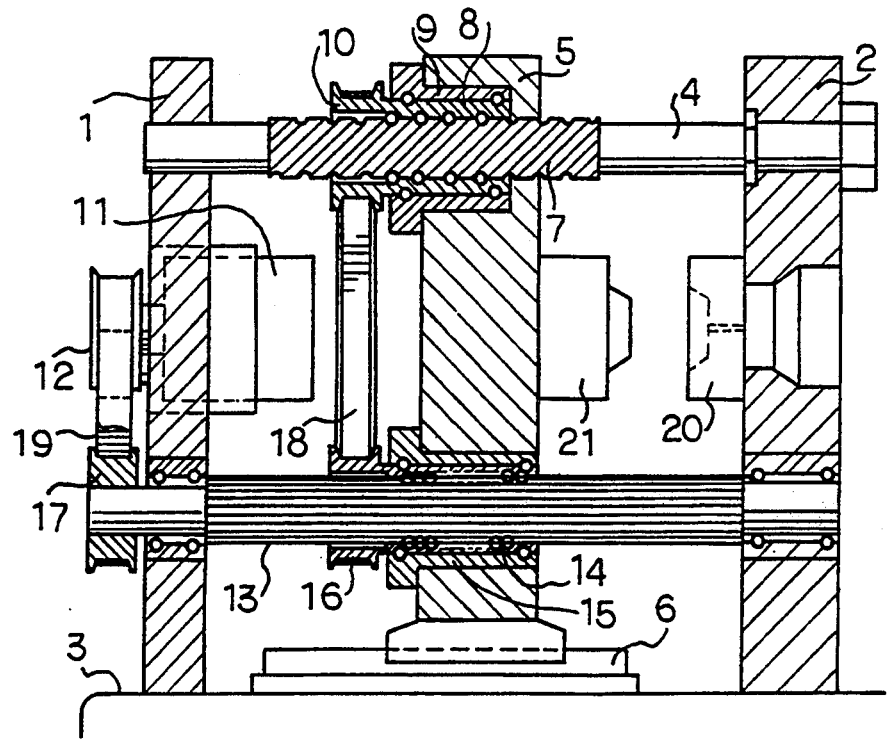
FIG. 1 is a sectional view of a motor driven type die tightening apparatus for an injection molding machine constructed according to an embodiment of the present invention, particularly showing the structure of the apparatus taken along line A—A in FIG. 2.
Figure 2:
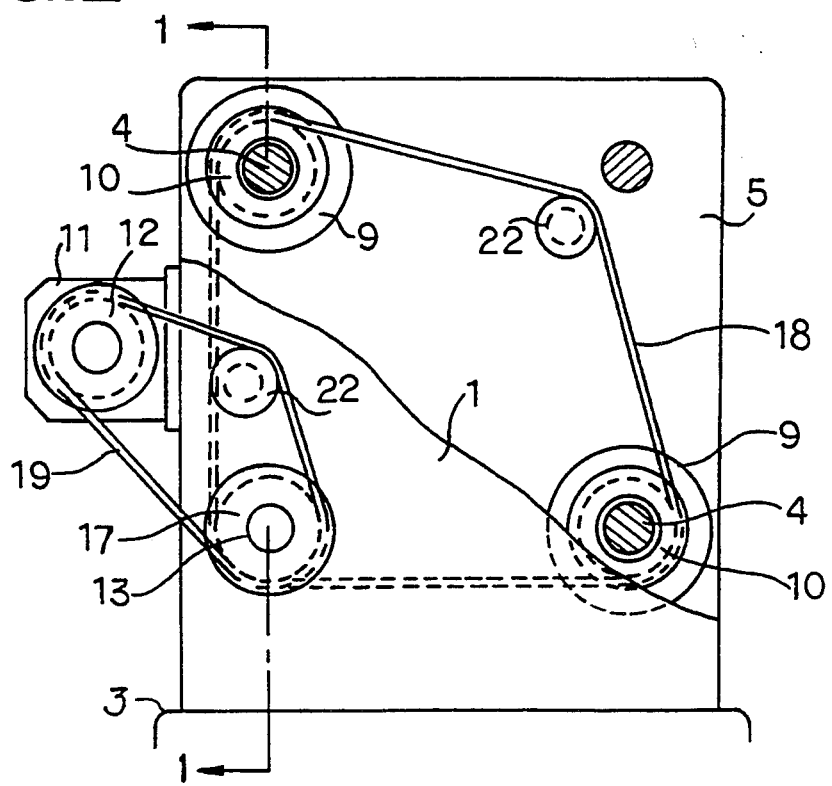
FIG. 2 is a front view of the apparatus shown in FIG. 1, particularly showing the structure of the apparatus as seen from the stationary die board side.

FIG. 1 and FIG. 2 show a motor driven type die tightening apparatus for an injection molding machine constructed according to an embodiment of the present invention. In FIG. 1, reference numerals 1 and 2 designate a pair of stationary die boards immovably mounted on a platform of the injection molding machine with a predetermined distance kept therebetween. Two tie bars 4 are horizontally bridged between both the stationary die boards 1 and 2 at the positions diagonally located on the latter. Reference numeral 5 designates a movable die board through which the tie bars 4 are inserted. The movable die board 5 is displaceably mounted on two guide members 6 laid on a platform 3 of the injection molding machine so as to move in the forward/rearward direction.

A part of each of the tie bars 4 is designed in the form of a ball screw shaft 7, and ball nut members 8 each adapted to be threadably engaged with the ball screw shaft 7 are rotatably received in stationary cases 9. Each ball nut member 8 is integrated with a pulley 10 of which rotary surface is machined to exhibit a series of gear teeth. As is best seen in FIG. 1, the geared pulleys 10 are located on the left-hand stationary die board 1 side.

Reference numeral 11 designates an electric motor such as a servomotor or the like. The electric motor 11 includes a geared pulley 12 at the foremost end part of an output shaft thereof, and it is installed on the left-hand side wall of the movable die board 5. Reference numeral 13 designates a rotational shaft designed in the form of a ball spline shaft. The rotational shaft 13 is rotatably bridged between both the stationary die boards 1 and 2 while extending through the movable die board 5. A rotary sleeve 14 operatively connected to the rotational shaft 13 via splines and balls is rotatably received in a stationary case 15 firmly fitted into the movable die board 5.

A geared pulley 17 is secured to the left-hand end part of the rotational shaft 13 projecting outside of the stationary die board 1. With such construction, a geared endless belt 18 is extended around the geared pulley 10, the geared pulley 16 and idlers 22, while another geared pulley 19 is extended around the geared pulley 12, the geared pulley 17 and an idler 22.

In FIG. 1, reference numeral 20 designates a stationary die half mounted on the stationary die board 2, and reference numeral 21 designates a movable die half mounted on the movable die board 5.

In this embodiment, as the electric motor 11 is rotationally driven, the rotation of the electric motor 11 is transmitted to the rotational shaft 13 via the geared pulley 12, the geared pulley 17 and the geared endless belt 19, and the rotation of the rotational shaft 12 is then transmitted to the ball nut member 8 via the geared pulley 16, the geared pulley 10 and the geared endless belt 18, causing the ball nut member 8 to be rotated, whereby the movable die board 5 is axially displaced along the rotational shaft 13 by threadable engagement of the ball nut member 8 with the ball screw shaft 7.

Obviously, the direction of displacement of the movable die board 5 varies depending on the direction of rotation of the electric motor 11. Referring to FIG. 2, when the electric motor 11 is rotated in the anticlockwise direction, the movable dir board 5 is displaced in the forward direction toward the stationary die board 2 until the stationary die half 20 mounted on the stationary die board 2 is closed with the movable die half 21 mounted on the movable die board 5 and the movable die half 21 is then tightened against the stationary die half 20. On the contrary, when the electric motor 11 is rotated in the clockwise direction, the movable die board 5 is displaced in the rearward direction away from the stationary die board 2 so that the stationary die half 20 is kept opened.

Next, FIG. 3 and FIG. 4 show a motor driven type die tightening apparatus for an injection molding machine constructed according to another embodiment of the present invention. Same components as those in the preceding embodiment are represented by same reference numerals. In this embodiment, four tie bars 4 are arranged at four corners of a pair of stationary die boards 1 and 2 so that the stationary die board 1 is connected to the stationary die board 2 via the tie bars 4 horizontally bridged therebetween, and a part of each of the tie bars 4 inserted through a movable die board 5 is designed in the form of a ball screw shaft 7. Since slidable displacement of the movable die board 5 is properly guided by the tie bars 4 arranged at four corners of the stationary die boards 1 and 2, it suffices that a rotational shaft 13 is horizontally bridged merely between the stationary die board 1 and the movable die board 5. This makes it possible to design the rotational shaft 13 with a small diameter.

While the present invention has been described above with respect to two preferred embodiments thereof, it should of course be understood that the present invention should not be limited only to these embodiments but various change or modification may be made without any departure from the scope of the present invention as defined by the appended claims.

What is claimed is:

1. A motor driven die tightening apparatus for an injection molding machine, comprising:
    a plurality of tie bars bridged between a pair of stationary die boards mounted on a platform of said injection molding machine,
    a movable die board displaceably arranged on said platform of said injection molding machine between said stationary die boards with said tie bars inserted therethrough,
    a ball screw shaft formed across a part of each of said tie bars inserted through said movable die board,
    a ball nut member threadably engaged with each of said ball screw shafts and having a geared pulley provided therewith, said ball nut members being rotatably received in said movable die board,
    an electric motor to rotate said ball nut members so that said movable die board is slidably displaced toward or away from one of said stationary die boards, said electric motor being installed on one of said stationary die boards,
    a rotary sleeve having a number of balls arranged on an inner peripheral surface thereof being received in a stationary case fitted into said movable die board, and
    a rotational shaft inserted through said rotary sleeve, said rotational shaft having a plurality of splines formed along an outer surface thereof, said balls of said rotary sleeve being in engagement with said splines of said rotational shaft so as to enable said movable die board to be displaced in an axial direction along said rotational shaft,
    wherein the ball nut members, the rotational shaft and the electric motor are operatively connected to each other via rotational power transmitting members, and
    as said electric motor is rotationally driven to rotate said ball nut members, said movable die board is slidably displaced toward or away from one of said stationary die boards.

2. The motor driven die tightening apparatus as claimed in claim 1, wherein said movable die board is mounted on guide members provided on said platform of said injection molding machine, and the weight of said movable die board is borne by said platform of said injection molding machine via said guide members.

3. The motor driven die tightening apparatus as claimed in claim 1, wherein said tie bars are arranged in a diagonal positional relationship relative to said stationary die boards and said movable die board while extending parallel with each other, and are secured to said stationary die boards.

4. The motor driven die tightening apparatus as claimed in claim 1, wherein said tie bars are arranged at four corners of said stationary die boards and said movable die board while extending parallel with each other, and are secured to said stationary die boards.

5. The motor driven die tightening apparatus as claimed in claim 1, wherein said rotational shaft is a spline shaft and is rotatably bridged between said movable die board and one of said stationary die boards while extending through said movable die board.

6. The motor driven die tightening apparatus as claimed in claim 1, wherein said rotational shaft is a ball spline shaft, said rotational shaft and said rotary sleeve are arranged at respective upper parts of said movable die board and one of said stationary die boards.

7. The motor driven die tightening apparatus as claimed in claim 1, wherein said electric motor is a servomotor.

8. The motor driven die tightening apparatus as claimed in claim 1, wherein each of said rotational power transmitting members is a geared endless belt.

* * * * *